(12) United States Patent
Kim

(10) Patent No.: US 10,508,402 B2
(45) Date of Patent: Dec. 17, 2019

(54) GROUND ANCHOR OF WHICH STRESS CAN BE SELF-DIAGNOSED, AND CONSTRUCTION METHOD THEREFOR

(71) Applicant: SOILTECH Korea Co., Ltd., Suwon-si (KR)

(72) Inventor: Ji-Ho Kim, Suwon-si (KR)

(73) Assignee: SOILTECH Korea Co., Ltd., Suwon-si (KR)

( * ) Notice: Subject to any disclaimer, the term of this patent is extended or adjusted under 35 U.S.C. 154(b) by 0 days.

(21) Appl. No.: 16/065,643

(22) PCT Filed: Mar. 30, 2016

(86) PCT No.: PCT/KR2016/003227
§ 371 (c)(1),
(2) Date: Jun. 25, 2018

(87) PCT Pub. No.: WO2017/111207
PCT Pub. Date: Jun. 29, 2017

(65) Prior Publication Data
US 2019/0017241 A1 Jan. 17, 2019

(30) Foreign Application Priority Data
Dec. 24, 2015 (KR) .................. 10-2015-0186723

(51) Int. Cl.
*E02D 5/80* (2006.01)
*E21D 21/00* (2006.01)
(Continued)

(52) U.S. Cl.
CPC ............. *E02D 5/801* (2013.01); *E02D 5/80* (2013.01); *E02D 5/808* (2013.01); *E21D 21/008* (2013.01);
(Continued)

(58) Field of Classification Search
CPC ....... E02B 5/80; E02B 5/808; E21D 21/0026; E21D 21/008
See application file for complete search history.

(56) References Cited

U.S. PATENT DOCUMENTS 3,828,435 A * 8/1974 Baker .................. E21F 17/185
33/1 H
3,934,465 A * 1/1976 Hanson ................. G01L 5/102
73/862.392

(Continued)

FOREIGN PATENT DOCUMENTS

JP  11-006158 A  1/1999
JP  2002-168709 A  6/2002
(Continued)

OTHER PUBLICATIONS

International Search Report (ISR) dated Feb. 10, 2017 in International Application No. PCT/KR2016/003227.
(Continued)

*Primary Examiner* — Benjamin F Fiorello
(74) *Attorney, Agent, or Firm* — Ichthus International Law PLLC

(57) ABSTRACT

The present disclosure relates to a self-diagnosis type ground anchor and a construction method. The self-diagnosis type ground anchor includes: a bond length part located at a predetermined depth of a boring hole excavated from a target surface of the ground; a head part located near the target surface; and a tensile material provided by connecting the bond length part and the head part in a state of receiving a tensile force, so as to deliver an anchorage force of the bond length part to a structure. The self-diagnosis type ground anchor further includes a displacement measurement material of which one end is fixed at a predetermined position of the bond length part and the other end is placed
(Continued)

in a free end form on the target surface, provided such that a relative displacement of the target surface for the bond length part can be detected.

7 Claims, 3 Drawing Sheets

(51) Int. Cl.
     *G01B 5/30*         (2006.01)
     *E21D 21/02*      (2006.01)

(52) U.S. Cl.
     CPC ......... *E21D 21/0026* (2013.01); *E21D 21/02* (2013.01); *G01B 5/30* (2013.01); *E02D 2600/30* (2013.01); *G01B 2210/66* (2013.01)

(56) References Cited

U.S. PATENT DOCUMENTS

| | | | | |
|---|---|---|---|---|
| 4,719,803 A * | 1/1988 | Capelle | ............... | E21B 47/00 73/784 |
| 5,545,987 A * | 8/1996 | Schutt | ............... | E02D 5/80 324/219 |
| 5,929,341 A * | 7/1999 | Bawden | ............... | E21D 21/02 73/152.59 |
| 6,696,974 B1 * | 2/2004 | Mathis | ............... | G01B 11/18 324/534 |
| 2013/0054156 A1 * | 2/2013 | Hyett | ............... | G01B 21/32 702/42 |

FOREIGN PATENT DOCUMENTS

| | | |
|---|---|---|
| KR | 10-1136371 B1 | 4/2012 |
| KR | 10-2012-0064767 A | 6/2012 |
| KR | 10-1547686 B1 | 9/2015 |

OTHER PUBLICATIONS

First Office Action in KR 10-2015-0186723 dated Jul. 6, 2016.
Second Office Action in KR 10-2015-0186723 dated Sep. 29, 2016.

* cited by examiner

GROUND ANCHOR OF WHICH STRESS CAN BE SELF-DIAGNOSED, AND CONSTRUCTION METHOD THEREFOR

CROSS-REFERENCE TO RELATED PATENT APPLICATION(S)

This application is the U.S. National Stage Entry of the International Application No. PCT/KR2016/003227, filed on Mar. 30, 2016, claiming priority to Korean Patent Application Nos. 10-2015-0186723, filed on Dec. 24, 2015, the entire content of which is incorporated herein by reference in its entirety.

TECHNICAL FIELD

The present invention relates to a ground anchor and a construction method thereof, used in civil engineering or construction sites.

BACKGROUND ART

A ground anchor method (earth anchor or ground anchor) refers to a landslide protection method, a slope reinforcement method, etc., for perforating the ground, installing a tensile material included in an anchor body, injecting and hardening grout to ensure bonding force, and applying tension to the tensile material included in the anchor body to counter ground pressure. After first attempted in 1874, a ground anchor method is recognized as an excellent method and has been widely used in various fields such as deep excavation, revetment reinforcement, water pressure counter, and tunnel and cut slope stabilization in civil engineering and construction sites and related technologies have been continuously developed.

A ground anchor has a bond length part that exerts stress of an anchor, a free length part that transfers the stress exerted by the bond length part, and an anchorage zone part that is an element for transferring consumed stress of the anchor directly to a structure. The bond length part is designed to sufficiently exert consumed stress in consideration of a ground type, a bonding method, a type of a tensile material, a grouting method, and so on and it is required to select appropriate bond stress $\tau$ according to a ground type. Except for a specific case, it is well known that an anchor becomes mostly damaged in the free length part and, thus, a function of the free length part is important. The free length part is formed of a steel bar, a steel strand, a steel wire, or the like and, in this regard, appropriate corrosion protection needs to be processed on the free length part according to purpose of use and a required persisting period. The anchorage zone part is classified into a button-type part, a wedge-type part, a nut-type part, and so on and its type is determined in consideration of future maintenance, purpose of use, and so on. In terms of a period of use, a ground anchor is classified into a temporary construction anchor that is removed after being used for a period of less than two years and a permanent anchor that is permanently applied along with a structure.

A long-term stress loss phenomenon inevitably occurs over time in a ground anchor due to creep characteristics, etc., of the ground. The phenomenon is based on a behavior and displacement of the ground around a bond length part of a ground anchor that is positioned in the ground and exerts bonding force of the ground anchor, and it is very difficult to accurately predict and check a behavior of the ground around the bond length part.

A technology known as a method of checking existing stress of a ground anchor includes a method of installing a load cell on each anchor, a method of checking existing stress via a lift off test, and the like. The method of installing a load cell requires installation costs of a load cell, power for measurement, a data logger, and so on and, thus, much costs for measurement are required and it is difficult to accurately determine a time point for measurement. In addition, for long-term measurement, a load cell is installed outdoor and, thus, measurement accuracy is disadvantageously degraded due to degraded durability.

The method of checking existing stress of a ground anchor via a lift off test also requires excessive test costs because of test equipment, test manpower, and so on and, thus, has not been widely used in reality. For the reasons thereof, a conventional method of checking existing stress of a ground anchor selectively has examined only some samples instead of all installed ground anchors in accordance with current trends.

DISCLOSURE

Technical Problem

An object of the present invention is to provide a ground anchor for simply checking existing stress of an installed ground anchor, for determining whether all installed ground anchors are stabilized and appropriate and for easily maintaining and managing the ground anchor.

Technical Solution

According to another aspect of the present invention, there is provided an existing stress self-diagnosis ground anchor including a bond length part positioned at a predetermined depth of a boring hole excavated from a target surface of the ground, a head portion positioned around the target surface, a tensile material configured to connect the bond length part and the head portion in a state of receiving tension and installed to transfer bonding force of the bond length part to a structure, and a displacement measurement member having one end fixed at a predetermined position of the bond length part and the other end positioned in the form of a free end on the head portion and installed to recognize relative displacement of the head portion with respect to the bond length part.

The ground anchor may further include a comparison marker formed to compare a reference position of the head portion and a position of the other end of the displacement measurement member.

The comparison marker may include a cap configured to surround the other end of the displacement measurement member and attached to the head portion.

The comparison marker may further include a detachable portion formed to be detachable from the head portion via force generated while the other end of the displacement measurement member contacts and pushes the detachable portion.

The displacement measurement member may be formed in the form of a steel bar or a steel wire.

The ground anchor may further include grout filled in the boring hole, wherein the displacement measurement member may be installed to be protected by a hose not to be attached to the grout.

The structure may be arranged between the head portion and the target surface.

The head portion may further include a through hole formed to allow the displacement measurement member to freely pass therethrough.

The head portion may include a fixing head formed to fix the tensile material and including a first hole formed in an intermediate portion of the fixing head to allow the displacement measurement member to pass therethrough, a distribution plate arranged between the fixing head and the structure, and a protective cap formed to protect the fixing head and the tensile material and including a second hole configured to allow the displacement measurement member to pass therethrough.

According to another aspect of the present invention, there is provided a construction method of an existing stress self-diagnosis ground anchor, the method including excavating a boring hole from a target surface of a ground, inserting a tensile material and a displacement measurement member into the boring hole, injecting grout into the boring hole to form a bond length part at a predetermined depth of the boring hole and protecting the displacement measurement member by a hose to prevent the displacement measurement member from contacting the grout, and installing a structure and a head portion on the target surface and fixing the tensile material to the head portion in a tensile state of the tensile material by predetermined force, the displacement measurement member being installed to freely pass through the head portion.

The method may further include installing a comparison marker formed to compare a reference position of the target surface and a position of an end of the displacement measurement member.

The comparison marker may include a cap having a detachable portion formed to be detachable from the head portion via force generated while the end of the displacement measurement member contacts and pushes the detachable portion.

Advantageous Effects

According to a stress self-diagnosis ground anchor and a construction method thereof according to the present invention, the stress self-diagnosis ground anchor may include a displacement measurement member having one end fixed at an arbitrary position of the bond length part and the other end positioned in the form of a free end on the head portion and installed to recognize relative displacement of the head portion with respect to the bond length part, thereby simply checking existing stress of the ground anchor with the naked eye without a separate device or measurer.

According to an embodiment of the present invention, the displacement measurement member may be formed in the form of a steel wire or a steel bar, a configuration and construction method for checking existing stress for each ground anchor may be simple, and existing stress of all anchors may be checked with low costs, thereby remarkably reducing measurement and test costs for checking the existing stress of the ground anchor.

According to another embodiment of the present invention, a comparison marker is formed to compare a reference position of the head portion and a position of the other end of the displacement measurement member and includes a cap having a detachable portion formed to be detachable from the head portion via force generated while the end of the displacement measurement member contacts and pushes the detachable portion. Accordingly, when displacement between the bond length part and the head portion occurs by an allowable value or more, the displacement measurement member is separated from the head portion by pushing the cap by the end of the displacement measurement member and, thus, whether the ground anchor is appropriate may be immediately checked with the naked eye on the spot, thereby easily maintaining of a structure with a ground anchor installed therein.

BEST MODE

Hereinafter, a stress self-diagnosis ground anchor and a construction method thereof according to the present invention will be described in detail with reference to the accompanying drawings.

Figure 1:
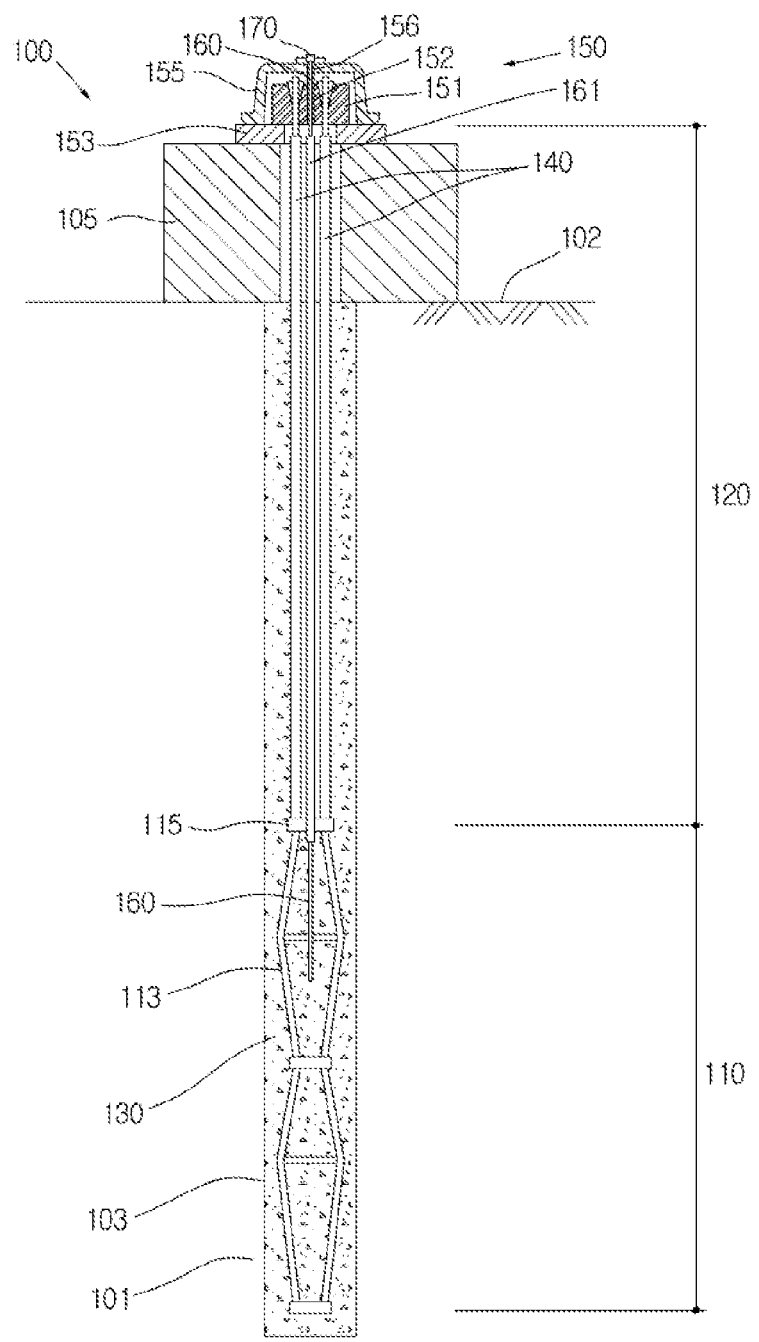
FIG. 1 is a schematic cross-sectional view of an example of an existing stress self-diagnosis ground anchor 100 according to the present invention.
Figure 2:
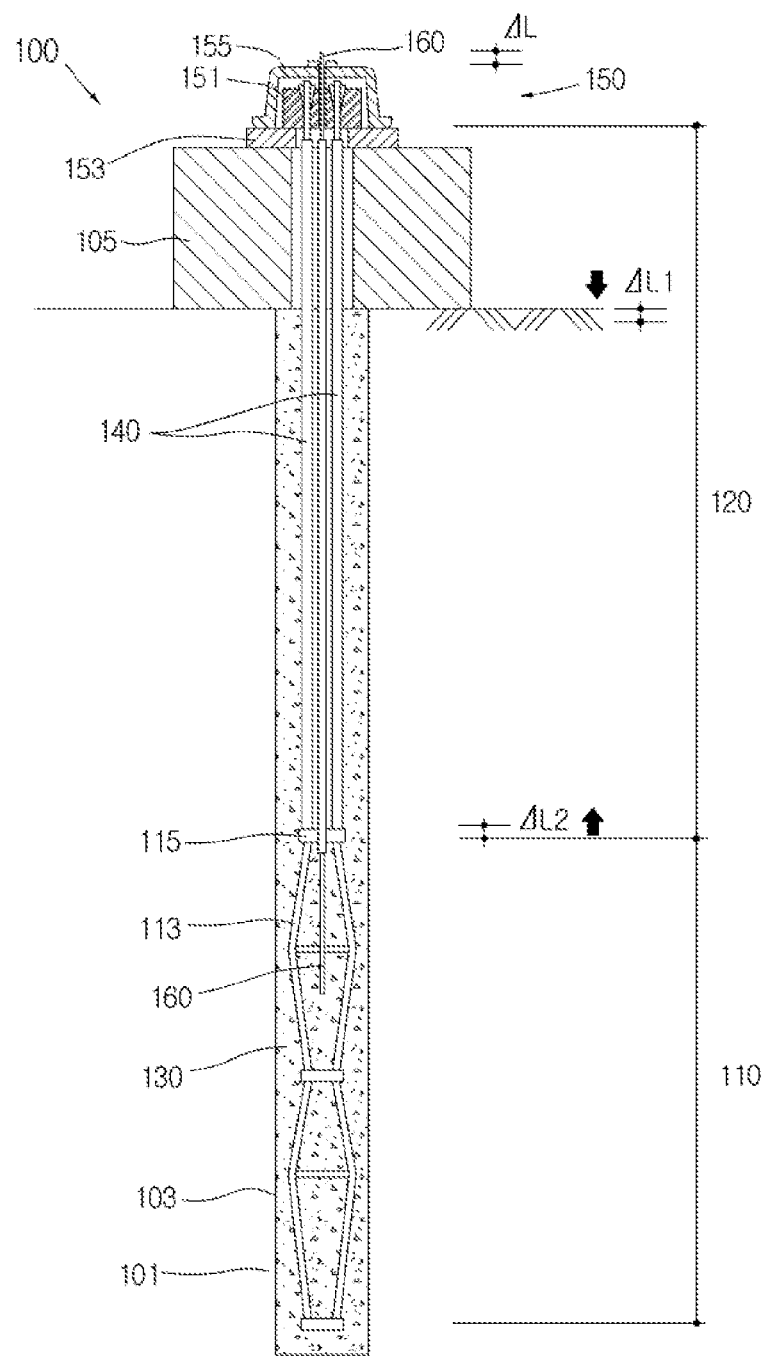
FIG. 2 is a diagram showing an example of an operational state in which existing stress is self-diagnosed through the ground anchor 100 of FIG. 1.
Figure 3:
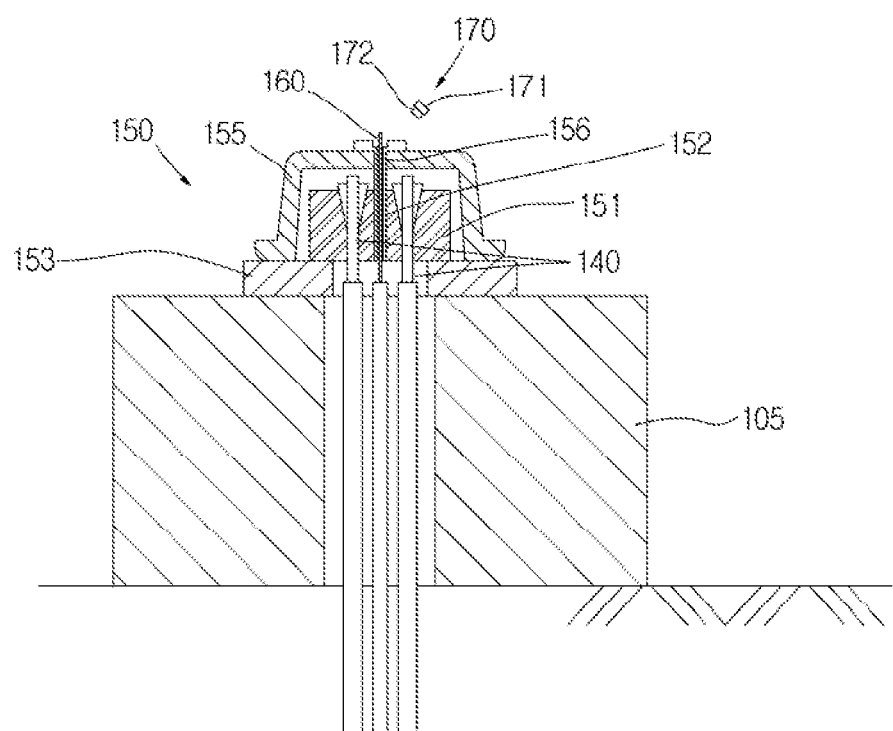
FIG. 3 is a schematic enlarged cross-sectional view of a head portion 150 and a comparison marker 170 according to the present invention.

FIG. 1 is a schematic cross-sectional view of an example of an existing stress self-diagnosis ground anchor 100 according to the present invention. FIG. 2 is a diagram showing an example of an operational state in which existing stress is self-diagnosed through the ground anchor 100 of FIG. 1. FIG. 3 is a schematic enlarged cross-sectional view of a head portion 150 and a comparison marker 170 according to the present invention.

The existing stress self-diagnosis ground anchor 100 according to the present invention may include a bond length part 110, a tensile material 140, the head portion 150, and a displacement measurement member 160. The bond length part 110 may be positioned at a predetermined depth of a boring hole 103 excavated from a target surface 102 of a ground 101 and exerts stress of a ground anchor. The head portion 150 may be positioned around the target surface 102 and may transfer existing stress of the anchor directly to a structure 105. The structure 105 may be positioned between the head portion 150 and the target surface 102, may support stress applied to the head portion 150, and may distribute force. The tensile material 140 may connect the bond length part 110 and the head portion 150 in a state of receiving tension and may be installed to transfer bonding force of the bond length part 110 to the structure 105. The boring hole 103 may be filled with grout 130 for fixing the bond length part 110. Accordingly, the bonding force of the ground anchor may be exerted by friction force between the ground 101 and the grout 130 and adhesion force between the grout 130 and the high-strength tensile material 140 positioned in the bond length part 110. As a so-called free length part 120, the tensile material 140 may be positioned between the bond length part 110 and the head portion 150 and may not be attached to the grout 130. The tensile material 140 in the free length part 120 may be deformed in proportion to the applied load according to Hooke's law and material properties of the tensile material 140 such as an elasticity coefficient of the tensile material 140 and a cross-section area and a length of the tensile material 140.

The displacement measurement member 160 may have one end fixed at a predetermined position of the bond length part 110 and the other end positioned in the form of a free end on the head portion 150 and may be installed to recognize relative displacement of the head portion 150 with respect to the bond length part 110. The displacement measurement member 160 may use an elongated member such as a steel bar or a steel wire. In this case, a portion of the displacement measurement member 160 may be attached to the bond length part 110 and the other portion of the displacement measurement member 160, positioned in the free length part 120, may not be attached directly to the grout 130 and may be protected by a hose 161. The head portion 150 may include through holes 152 and 156 formed to allow the displacement measurement member 160 to freely pass therethrough. In terms of configuration, the head portion 150 may include a fixing head 151 for fixing the tensile material 140, a distribution plate 153 arranged between the fixing head 151 and the structure 105, and a protective cap 155 formed to protect the fixing head 151 and the tensile material. A first hole 152 may be formed in an intermediate portion of the fixing head 151 to allow the displacement measurement member 160 to freely pass therethrough and a second hole 156 may also be formed in an intermediate portion of the protective cap 155 to allow the displacement measurement member 160 to pass therethrough.

As shown in FIG. 3, the comparison marker 170 may be formed at an end of the displacement measurement member 160 to compare a reference position of the head portion 150 and a position of the end of the displacement measurement member 160. The comparison marker 170 may include a cap 171 that surrounds the end of the displacement measurement member 160 and is attached to the head portion 150. In this case, the comparison marker 170 may include a detachable portion 172 that is formed to be detachable from the head portion 150 via force generated while the end of the displacement measurement member 160 contacts and pushes the detachable portion 172.

In a state in which tension is not applied to the displacement measurement member 160, the displacement measurement member 160 installed at an arbitrary position of the bond length part 110 may have the same length as that of the tensile material 140 that elastically extends via tension in an initial state. However, as shown in FIG. 2, when existing stress of a constructed ground anchor is changed, an extended length of the tensile material 140 included in the free length part 120 of the ground anchor may also be changed. That is, when the existing stress of the ground anchor is reduced for any reason, the extended length may be reduced by as much as the reduced load. The existing stress in the ground anchor may be reduced, which is mainly caused by ground subsidence due to anchoring force that is changed or introduced via creep of a portion of the bond length part 110. That is, subsidence (ΔL1) of a foundation ground may be caused or a boundary portion 115 of the bond length part 110 of the ground anchor may be moved upward to cause displacement (ΔL2) by action force introduced to the ground anchor. In this case, the length of the free length part 120 may be changed and, in this regard, the displacement caused by the two reasons may directly reduce existing stress of a ground anchor and, in this case, the displacement amount generated by the two reasons may be represented as displacement ΔL of the displacement measurement member 160 that is installed at an arbitrary portion of the bond length part 110 and is installed to extend through the fixing head 151 and the protective cap 155. In this case, the displacement ΔL of the displacement measurement member 160 may be measured to calculate existing stress of a current ground anchor.

In a state in which a displacement may be preset based on allowable loss stress according to management standard of existing stress of an anchor, which is established during calculation of the displacement ΔL of the displacement measurement member 160, and the cap 171 is installed to be spaced apart from an upper end of the displacement measurement member 160 by an allowable displacement amount, when a displacement amount causing stress loss of an installed ground anchor exceeds an allowable value and is generated in the displacement measurement member 160, the end of the displacement measurement member 160 may be moved upward and the cap 171 that is detachably installed on the protective cap 155 may be separated from the protective cap 155 to simply determine whether the installed ground anchor is appropriate with the naked eye (refer to FIG. 3).

Hereinafter, a construction method of a stress self-diagnosis ground anchor according to the present invention is described.

First, the boring hole 103 may be excavated from the target surface 102 of the ground 101 (S10). Here, the target surface 102 may be various target surfaces on which a ground anchor is installed in construction or civil engineering sites and may include a cut surface or the like.

Then, tensile materials 113 and 140 and the displacement measurement member 160 may be inserted into the boring hole 103 (S20). The high-strength tensile material 113 may be included in the bond length part 110 and may provide bonding force to the tensile material 140 via adhesion force with the grout 130.

In a state in which the tensile materials 113 and 140 and the displacement measurement member 160 are inserted into the boring hole 103, the grout 130 may be injected into the boring hole 103 to form the bond length part 110 at a predetermined depth of the boring hole 103 (S30). In this case, the tensile material 140 and the displacement measurement member 160 may be pre-protected by the hose 161 in operation S20 to prevent the tensile material 140 and the displacement measurement member 160 included in the free length part 120 from contacting the grout 130.

Then, the structure 105 and the head portion 150 may be installed on the target surface 102 and, in a tensile state of the tensile material 140 by predetermined force, the tensile material 140 may be fixed to the head portion 150 (S40). In this case, the displacement measurement member 160 may be installed to freely pass through the head portion 150.

The comparison marker 170 may be installed at an end of the displacement measurement member 160 (S50). The comparison marker 170 may include the cap 171 including the detachable portion 172 detachable from the protective cap 155 of the head portion 150. The cap 171 may employ predetermined color, fluorescent color, or the like to easily identify whether the cap 171 is detached.

The aforementioned stress self-diagnosis ground anchor and construction method thereof are not limited to the configurations and operation method according to the aforementioned embodiments. The aforementioned embodiments may be optionally partially or wholly combined to make various modifications.

The invention claimed is:
1. An existing stress self-diagnosis ground anchor comprising:
a bond length part positioned at a predetermined depth of a boring hole excavated from a target surface of a ground;
a head portion positioned around the target surface;

a tensile material configured to connect the bond length part and the head portion in a state of receiving tension and installed to transfer bonding force of the bond length part to a structure;

a displacement measurement member having one end fixed at a predetermined position of the bond length part and the other end positioned in a form of a free end on the head portion and installed to recognize a relative displacement of the head portion with respect to the bond length part; and a comparison marker formed to compare a reference position of the head portion and a position of the other end of the displacement measurement member, wherein the comparison marker includes:

a cap configured to surround the other end of the displacement measurement member and attached to the head portion, and a detachable portion formed to be detachable from the head portion via force generated while the other end of the displacement measurement member contacts and pushes the detachable portion.

2. The existing stress self-diagnosis ground anchor of claim 1, wherein the displacement measurement member is formed in a form of a steel bar or a steel wire.

3. The existing stress self-diagnosis ground anchor of claim 2, further comprising grout filled in the boring hole, wherein the displacement measurement member is installed to be protected by a hose not to be attached to the grout.

4. The existing stress self-diagnosis ground anchor of claim 1, wherein the structure is disposed between the head portion and the target surface.

5. The existing stress self-diagnosis ground anchor of claim 1, wherein the head portion includes a through hole formed to allow the displacement measurement member to freely pass therethrough.

6. The existing stress self-diagnosis ground anchor of claim 1, wherein the head portion includes:

a fixing head formed to fix the tensile material and including a first hole formed in an intermediate portion of the fixing head to allow the displacement measurement member to pass therethrough;

a distribution plate arranged between the fixing head and the structure; and a protective cap formed to protect the fixing head and the tensile material and including a second hole configured to allow the displacement measurement member to pass therethrough.

7. A construction method of an existing stress self-diagnosis ground anchor, the method comprising:

excavating a boring hole from a target surface of a ground;

inserting a tensile material and a displacement measurement member into the boring hole;

injecting grout into the boring hole to form a bond length part at a predetermined depth of the boring hole and protecting the displacement measurement member by a hose to prevent the displacement measurement member from contacting the grout;

installing a structure and a head portion on the target surface and fixing the tensile material to the head portion in a tensile state of the tensile material by predetermined force, the displacement measurement member being installed to freely pass through the head portion; and installing a comparison marker to compare a reference position of the target surface and a position of an end of the displacement measurement member, wherein the comparison marker includes a cap having a detachable portion formed to be detachable from the head portion via force generated while the end of the displacement measurement member contacts and pushes the detachable portion.

* * * * *